United States Patent [19]

Boaz

[11] Patent Number: 5,518,535
[45] Date of Patent: May 21, 1996

[54] WATER-BASED PAINT FOR GLASS SHEETS

[75] Inventor: Premakaran T. Boaz, Livonia, Mich.

[73] Assignee: Ford Motor Company, Dearborn, Mich.

[21] Appl. No.: 415,951

[22] Filed: Mar. 24, 1995

[51] Int. Cl.⁶ .................................................. B28B 7/36
[52] U.S. Cl. .................. 106/38.3; 106/425; 106/431; 106/600; 106/635
[58] Field of Search .................... 106/38.3, 425, 106/431, 600, 635

[56] References Cited

U.S. PATENT DOCUMENTS

| | | | |
|---|---|---|---|
| 3,410,706 | 11/1968 | Peeler, Jr. | 106/635 |
| 3,769,050 | 10/1973 | Terry et al. | 106/84 |
| 3,895,136 | 7/1975 | Makishima et al. | 427/257 |
| 4,318,743 | 3/1982 | Blasko et al. | 106/84 |
| 4,334,933 | 6/1982 | Abe et al. | 106/414 |
| 4,375,373 | 3/1983 | Abe et al. | 106/403 |
| 5,310,422 | 5/1994 | Abdel-Latif | 106/635 |

FOREIGN PATENT DOCUMENTS 53-119932  10/1978  Japan.

*Primary Examiner*—Hoa Van Le
*Attorney, Agent, or Firm*—Lorraine S. Melotik; Roger L. May

[57] ABSTRACT

The invention is directed to a water-based paint composition comprising sodium silicate, water, water-soluble base, metal oxide pigment, and zinc oxide as an adhesion promoter. Preferably, it further comprises glass frit and surfactants. In other aspects, it is directed to the method of making the composition, and glass sheets having a cured paint field thereon, and the method of making such glass sheets.

6 Claims, No Drawings

WATER-BASED PAINT FOR GLASS SHEETS

FIELD OF THE INVENTION

This invention is directed to water-based paint compositions particularly useful for providing a paint field on glass sheets. The paint composition comprises sodium silicate, water, water-soluble base, finely divided metal oxide pigment, and zinc oxide as an adhesion promoter.

BACKGROUND OF THE INVENTION

Various paint compositions are known to skilled artisans for painting automotive and architectural glass. Such paints are used, for example, to form opaque borders around the peripheral marginal surfaces of glazings used as windshields, sidelites, and backlites of motor vehicles.

Generally these compositions are ceramic compositions formed from a mixture of metal oxides in an organic vehicle. The mixture of metal oxides is adjusted so as to achieve a specific color for the ultimately produced fired ceramic paint. For example, the opaque peripheral marginal paint bands fired onto automotive glazings are generally black and may include oxides like chrome oxide, cobalt oxide and nickel oxide. The organic vehicles generally included in such compositions, e.g., pine oil, mineral oils, low molecular weight petroleum fractions and the like are used to allow the ceramic paint to be applied to the glass surface by brushing, spreading, or screen printing. The metal oxides are non-reactive with one another, as well as non-reactive with other materials like glass frits often contained in the ceramic paint. These glass frits are the materials which ultimately fuse the ceramic paint together, and to the glass sheet, to insure that the ceramic paint remains affixed to the glass sheet after being cooled to room temperature. When these materials are applied to a glass sheet, they are heated at high temperatures generally above the softening point of the glass to cure the paint and make the painted glass sheets suitable for further handling during a latter high temperature shaping process.

In view of environmental and commercial considerations, it would be desirable if water-based paints could be developed for use in place of such organic vehicle paints. It would be further desirable to develop a water-based paint which could be cured at relatively low temperatures rather than the high temperatures generally required for ceramic/organic vehicle paint curing. Subjecting the glass having the paint coating to such high temperatures during curing of the paint often impart undesirable optical distortions into the glass sheets. In order to be suitable as a replacement for the conventionally used ceramic paints, the water-based paint would need to provide a uniform coating, be durable, and also adhere well to the glass.

It is an object of the present composition to provide a water-based paint composition which displays excellent adhesion to glass. It is a further object of this invention to provide a water-based paint which is curable at relatively low temperatures and which exhibits excellent durability. Advantageously, the present invention water-based paint composition achieves these objectives and hence overcomes the disadvantages of prior art ceramic/organic vehicle paints.

DISCLOSURE OF THE INVENTION

This invention is a water-based paint composition, which has excellent adhesion to glass. The composition comprises:

(i) water-soluble sodium silicate forming 20 to 40 weight percent of the composition, (ii) water forming 5 to 25 weight percent of the composition;

(iii) water-soluble base in an amount sufficient to provide the composition with a pH of at least about 10.5;

(iv) finely divided metal oxide powder being selected from the group consisting of oxides of copper, iron, nickel, cobalt and mixtures thereof forming 25 to 40 weight percent of the composition and having a particle size less than 7 microns; and (v) zinc oxide forming 2 to 10 weight percent of the composition.

The composition preferably also comprises glass frit in low amounts. The invention is further directed to a process of making the disclosed water-based paint which comprises combining and mixing the components. According to another embodiment of the present invention, it comprises a glass sheet having at lease a portion coated with a cured paint made from the above disclosed composition. According to still another embodiment of the invention, it comprises a method for providing a cured coating of the paint on a glass sheet.

DETAILED DESCRIPTION OF PREFERRED EMBODIMENTS

The invention composition is a water-based paint useful as a coating on glass, such as for the "black out" area around the periphery of a windshield. The composition comprises, as disclosed above, water-soluble sodium silicate, water, water-soluble base, finely divided metal oxide powder which gives the paint its black to grey color, and zinc oxide as an adhesion promoter. Each of these components, as well as optional components, will be discussed in detail below.

Water-soluble sodium silicates form between about 20 and 40 weight percent of the composition of this invention, more preferably, between about 30 and 36 weight percent of the composition, i.e., as used herein "weight percent of the composition" meaning a fraction of the total weight of the composition. They may comprise a single sodium silicate or a mixture of silicates. Water-soluble sodium silicates useful in this invention composition can be represented by the formula $SiO_2:Na_2O$, wherein the mole ratio therein of the two oxides is from about 2:1 to about 4:1. In addition to the water-soluble sodium silicate, water-soluble potassium silicates of similar formula may also be included in the composition. When they are included, they are generally present in minor amounts, preferably less than 10 percent by weight, generally between about 5 and 10 weight percent of the composition.

Yet another required component of the composition is water which is included in an amount between about 5 and 25 weight percent of the total composition weight, preferably in an amount between about 10 and 20 weight percent. The composition also includes a water-soluble base which is employed to provide the paint composition with a pH of at least about 10.5, preferably being above 12.5, more preferably about 13.5. The pH is required to be on the basic side as is indicated by the required pH. Providing the composition with this pH is necessary to impart desirable shelf life to the paint. Embodiments of invention paints with a pH above about 13, for example, have been found to be shelf stable for at least 3 months. Examples of water-soluble bases which may be employed include but are not limited to sodium hydroxide and potassium hydroxide, with sodium hydroxide being preferred.

The amount of base employed is dependent, e.g., on the particular base and concentration employed. For example, using a 1N sodium hydroxide base, is generally included in about 2 to 10 weight percent of the composition, more preferably in about 3 to 8 weight percent, and most optimally, in about 3 to 6 weight percent. Optimal amounts and types of bases which may be employed would be apparent to those skilled in the art in view of the present disclosure.

The composition further comprises finely divided metal oxide pigment selected from copper oxide, iron oxide, nickel oxide, cobalt oxide and mixtures thereof, with the inclusion of copper oxide being preferred. This pigment gives the paint a black color and forms 25 to 40 weight percent of the composition, preferably between about 25 to 35 weight percent of the composition. The finely divided powder pigment has a particle size (diameter) on average less than about 7 microns, preferably being between about 3 and 7 microns, most preferably being about 5 microns. These compositions would vary in color from black to dark grey, depending on the mixture and percentages of the metal oxides. Copper oxide, which is preferred, provides a black paint composition. It is undesirable to use chromium oxide in the composition since it interferes with the adhesion of the paint to the glass.

Another essential component of the paint composition is a minor amount of adhesion promoter, i.e., zinc oxide in this invention paint. This adhesion promoter is included in the composition in an amount of between about 2 and 10 weight percent, preferably between about 3 and 6 weight percent, most preferably between about 4 and 6 weight percent, based on the weight of the composition. Optimally, about 6 weight percent zinc oxide is included in the composition. It is preferred that the zinc oxide be provided in the paint composition in a particle size of between about 2 and 3 microns on average, however particle size is not critical. While not wishing to be bound by theory, the inventor believes that the zinc oxide lowers the expansion coefficient of the silicate paint composition and makes it more nearly match that of the glass composition. Hence, during heating and cooling of the glass, less stress develops in the paint because the glass and paint are reasonably closely matched in thermal expansion coefficients. Less stress in the paint is believed to result in good adherence of the paint to the glass substrate. Neither the understanding nor the accuracy of this theory is however necessary for the practice of this invention.

In addition to the above required components, the paint composition optionally, but preferably, comprises a small amount of low melting point glass frit, i.e., generally comprising less than about 10 weight percent, more preferably being between about 2 and 4 weight percent of the present invention blackish paint composition. Preferably, the low melting glass frit, when included, is present in the composition in an amount of about 3 weight percent, based on the total composition weight. By low melting glass frit is meant a glass material which melts below about 1300° F. Exemplary of preferred glass frit materials useful in the present composition, often referred to as enamel frit, are zinc boro-silicate glass and bismuth boro-silicate glass, and mixtures thereof. Still other glass fries which may be employed in the present invention will be apparent to those skilled in the art in view of the present disclosure. I have found that including this frit material in the glass composition further improves the adhesion of the paint to the glass.

Still another optional, but desirable, component included in the black paint composition of this invention is a surfactant. Surfactants are well known materials and often added to paints to improve the wetting characteristics of the liquid paint to the substrate to which it is applied. Exemplary of one such material is "FC-171" made by 3M Company. Still other surfactants are known to those skilled in the art. Desirably, it forms about 0.1 to 1.0 weight percent of the paint composition, more preferably about 0.25 to 0.5 weight percent.

To make the composition, the components are generally added together and then balled milled until a substantially uniform mixture of components is obtained. This mixing is generally carried out at room temperature. Often, the base is added after the ball milling or in the final stages of the milling. A water-based paint composition is commercially available which contains alkali silicates, water, base, and pigment like copper oxide, i.e., CERAM-VUE™ (CV1-112 Black, Industrial Control Development, Inc, Vancouver, Wash.), which is a black water-based silicate paint of this type. If one adds the zinc oxide powder to this composition at the levels indicated above, this composition after it is cured becomes more adherent to glass sheets on which it is applied.

After making the subject invention composition, it may be applied to a substrate, particularly a glass substrate, by any technique. The glass sheet may be prepared from any type of glass generally known in the art of glass making. Typical glass sheets contemplated for use according to the present invention are soda-lime-silica automotive and architectural glazings, generally produced by the well-known float glass process.

In operation, the paint is applied as a uniform layer to a surface of the glass sheet in a predetermined pattern by a conventional paint application method, e.g., screen printing wherein the paint is spread across the screen by a squeegee to force the paint through the pattern onto the glass sheet. It is well known in the painting arts to apply a band of paint to the surface of an automotive glazing by silk screening. In such a situation, it is particularly desirable to maintain a moist environment surrounding the paint during the screening process. Optimally the moist environment is maintained about 80+5% rh with the present invention preferred paint compositions. Maintaining this moist environment allows for prolonged use of the paint application screen system by maintaining the moisture content of the paint at a desirable viscosity for application. This environment may be optimally provided, e.g, by the invention described in U.S. patent application Ser. No. 08/295,574 filed Aug. 25, 1994 to Boaz and commonly assigned with this invention. It is entitled "Apparatus and Method for Applying a Coating to Glass".

The predetermined pattern in which the paint may be applied to a glass sheet may comprise, for example, an opaque concealment band positioned on a peripheral marginal surface of an automotive glazing. Such concealment bands are well known in the art of automotive glazings as useful for preventing the solar radiation induced degradation of adhesives used to mount the glazings in a vehicle opening, and for concealing attachment hardware and structural components which lie below the edges of the glazings. The band generally extends to the edges of the glazings, and has a width sufficient to conceal the underlying adhesive and structural components, but which is sufficiently narrow to provide maximum vision to occupants of the vehicle. Clearly, other predetermined patterns may be utilized where applying various paint fields to glass surfaces, depending upon the ultimate purpose for the cured paint field.

In the case of coatings applied to automotive glass as "black out", the coating is preferably provided in a thickness of about 12–16 microns. The coating may be applied in any thickness, however, the optimal thickness being determined by the particular application desired.

The curable compositions of the invention, after being applied to a substrate, are readily cured by baking at an elevated temperature for a time sufficient to drive off the water which cures the coating. This step may be carried at any temperature, but desirably at a temperature below the softening point of the glass. Since this water vaporization and curing can be preferably carried out at moderate temperatures, e.g., below about 400° C., even between about 100° C. and 200° C., the painted glass is not subjected to softening and hence is prevented from being distorted during the moderate temperature.

This is in contrast to conventional organic vehicle paints which require being heated to temperatures above the softening point of the glass to cure these paints. Paint compositions applied to glass sheets are generally first cured in order to make the painted glass available for handling for further processing, i.e., bending of the painted glass sheet into a desired final shape. Heating glass to temperatures above the softening point of the glass to cure organic vehicle paints provides the glass with an opportunity to pick up distortions. Subsequent bending of the painted glass, in a second firing, again at these high temperatures provides a second opportunity for distortions to be incorporated into the glass product. Hence, the present invention paint, because in can cure at relatively low temperatures below the softening point of the glass, desirably minimizes the opportunity for distortion to be incorporated into the glass product.

This drying and curing of the water-based black paint composition may be carried out by any means. Two particularly preferred means comprise subjecting the paint applied to the glass to Infra Red (IR) radiation or microwave radiation as in a microwave oven. The latter is most particularly preferred because it may be provided as a compact unit of relatively small size, it consumes less energy and generally requires less maintenance.

In the case of a windshield type 12"×12" sample which had an embodiment of the invention paint composition applied to a portion of its surface as a "black out" band, it was found that the coating could be cured in about one minute at 150° C. in an IR oven or about 1 minute in a microwave oven (4 KW power). The particular embodiment of paint composition employed and the area coated suggest the optimal particular parameters useful to cure the invention paint.

As is evident, the present invention moderate temperature curable compositions are of considerable advantage in that they provide for significant energy savings in comparison to compositions which require significantly elevated temperatures for curing. In addition, as discussed above, when the substrate is glass, optical distortions can be incorporated into the glass sheet when it is exposed to significantly elevated temperatures as required to cure conventional organic vehicle glass coatings. The present invention composition overcomes this disadvantage of prior art coatings which require elevated temperatures for curing the paint. While, as described above, the paint finds particular usefulness on glass, it may also be used to paint other substrates, including, e.g., metal or plastic.

Generally, coated automotive glass will subsequently be subjected to shaping which involves subjecting the glass to high temperatures of the order of 550° C. or more in a lehr. This will allow the coating to further cure, although such is not required to provide a durable and adherent coating on a substrate.

The following examples are presented by way of description of the invention and to set forth the best mode contemplated by the inventor, but are not to be construed as limiting.

EXAMPLES

The following three examples are embodiments of paint compositions made according to the present invention. All component amounts are in weight percent of the total paint composition.

| Paint # | 1 | 2 | 3 |
|---|---|---|---|
| Sodium Silicate |  | 32 | 39.25 |
| Potassium Silicate | 4 | 4.5 | 13 |
| Water | 20 | 19 | 16 |
| Sodium Hydroxide (1 N) | 8 | 6 | 4 |
| Copper Oxide | 32 | 32 | 34 |
| Zinc Oxide | 2 | 4.0 | 4.0 |
| Frit (zinc borosilicate) | 1.8 | 2.0 | 1.7 |
| Surfactant (FC-171 3M Company) | 0.2 | 0.5 | 0.3 |

A paint composition (No. 4) was made according to an embodiment of the present invention by adding zinc oxide and surfactant (FC-171, 3M Company) to a commercially available silicate paint (CB-555-195, A. O. Smith Company) in the following weight percent amounts of the total composition: 93.54 silicate paint, 6.0 zinc oxide, and 0.51 surfactant.

The paint compositions above were applied by screen printing to glass (soda-lime-silica) sheets to a thickness of 12 microns and cured in an IR over for 3 minutes at 120° C.

The black cured paint displayed uniform coating and excellent adherence to the glass as was shown by subjecting the painted glass to a hot water bath for 5 days at 60° C. whereby the taint showed no delamination. Similar paint compositions without the zinc oxide adhesion promoter (hence not according to the present invention) are subject to delamination under similar test conditions.

The paints were also tested for adhesion to urethane type adhesives, by the test described below, since these adhesive materials are often used in contact with glass for mounting into a vehicle.

Urethane Adhesive/Paint/Glass Adhesion Test

The surface of a glass panel is painted and the paint fully cured by passing it through an oven which heats the glass to over 550° C. A portion (stripe) of the painted surface is prepared for urethane adhesion by first applying a coating of Essex glass primer—Prep. No. 43519. On this prepared surface, another layer of Essex glass primer No. 43520A is applied. The primer is allowed to dry for about 10 minutes at room temperature, and then a "bead" of Essex urethane polymer adhesive is applied on the primer coatings. A second glass panel is prepared in identical fashion except that the urethane adhesive is not applied. The two glass panels are then pressed into contact so that the urethane adhesive contacts the primer of the second panel, leaving about 0.25' between the painted surfaces of the panels. The pair is allowed to cure for 72 hours in air. To pass the adhesion test, the urethane and not the adhesive surface muse break when the panels are twisted against each other. The reliability of adhesion is tested after the adhered pair is immersed in water at 150° C. for a chosen length of time.

The above paint compositions all showed excellent adhesion and successfully passed the urethane adhesion test.

The paint compositions of the following examples, both according to embodiments of the present invention (#6 and #7) and comparative (#4 and #5) were tested for adhesion to urethane polymer adhesives as described above and also to polyvinyl butyral (used as an interlayer in windshields) as follows:

Vinyl/Paint/Glass Adhesion "Pummel Test"

A 3" border of a paint is provided in a laminated pair of glass panels with the paint being on a surface in contact with a polyvinyl butyral interlayer. The laminate is cooled and stabilized at −10° C. for four hours. At the end of the four hours, the laminate is quickly removed and the painted portion placed over an anvil whereafter the portion is subjected to a five minute series of blows from a heavy hammer. At this temperature, the vinyl is hard and has poor adhesion to the crushed glass particles. The adhesion of the glass particles to the vinyl is rated by comparison to standards defined from #1 to #10,3, #1 indicating complete loss of adhesion between the vinyl/paint/glass and #10 indicating full adhesion of vinyl/paint/glass.

The following paints #4, #5, #6, and #7 contained relatively the same sodium silicate, potassium silicate, water, and pigment components. Additional components are listed for the particular examples (weight percent).

Paint #4: Basic composition: sodium silicate and potassium silicate, water, and pigment (copper oxide). Comparative example, not according to an embodiment of the present invention in that it does not contain zinc oxide.

Paint #5: Basic composition with 2% zinc borosilicate frit. Comparative example, not according to an embodiment of the present invention in that it does not contain zinc oxide.

Paint #6: Basic composition with 2% zinc borosilicate frit and 5% ZnO, according to an embodiment of the present invention.

Paint #7. Basic composition with 5% zinc oxide, according to an embodiment of the present invention.

| Results of Pummel Tested Vinyl/Paint/Glass | |
|---|---|
| #4 paint: #1–#2 Pummel Test Pummel Test | #6 paint: #6–#8 |
| #5 paint: #4–#6 Pummel Test Pummel Test | #7 paint: #6–#8 |

| Results of Urethane/Paint/Glass Adhesion Test, After: | | | | |
|---|---|---|---|---|
| | 4 Hours | 24 Hours | 48 Hours | 120 Hours |
| #4 paint | failed | — | — | — |
| #5 paint | passed | passed | passed | failed |
| #6 paint | passed | passed | passed | passed |
| #7 paint | passed | passed | passed | passed |

It can be seen from the above test results, that the inclusion of zinc oxide significantly improved the adhesion of paint, which is further improved by the inclusion of the zinc borosilicate frit.

I claim:

1. A water-based paint composition, which has excellent adhesion to glass, comprising:
   (i) water-soluble sodium silicate forming 20 to 40 weight percent of said composition,
   (ii) water forming 5 to 25 weight percent water;
   (iii) water-soluble base in an amount sufficient to provide said composition with a pH of at least 10.5;
   (iv) finely divided metal oxide powder selected from the group consisting of oxides of copper, iron, nickel, cobalt and mixtures thereof forming 25 to 40 weight percent of said composition and having a particle size less than 7 microns; and
   (v) zinc oxide forming 2 to 10 weight percent of said composition.

2. The water-based paint composition according to claim 1 wherein said composition further comprises less than about 10 percent by weight glass frit based on the total weight of said composition.

3. The water-based paint composition according to claim 1 wherein said composition further comprises potassium silicate.

4. The water-based paint composition according to claim 1 wherein said water-soluble base is sodium hydroxide.

5. The water-based paint composition according to claim 1 wherein said composition further comprises 0.1 to 1.0 weight percent surfactant.

6. A water-based paint composition, which has excellent adhesion to glass, comprising:
   (i) water-soluble sodium silicate forming 30 to 36 weight percent of said composition,
   (ii) water forming 10 to 20 weight percent water;
   (iii) water-soluble base in an amount sufficient to provide said composition with a pH of at least 10.5;
   (iv) finely divided copper oxide powder forming 25 to 35 weight percent of said composition and having a particle size between 3 and 7 microns;
   (v) zinc oxide forming 4 to 6 weight percent of said composition; and
   (vi) surfactant forming 0.1 to 1.0 weight percent of said composition.

* * * * *